United States Patent
Dallas et al.

(10) Patent No.: US 10,248,981 B1
(45) Date of Patent: Apr. 2, 2019

(54) PLATFORM AND ACQUISITION SYSTEM FOR GENERATING AND MAINTAINING DIGITAL PRODUCT VISUALS

(71) Applicant: Prisma Systems Corporation, Burnham, IL (US)

(72) Inventors: Isaac Dallas, Normal, IL (US); Christopher Richards, Normal, IL (US)

(73) Assignee: Prisma Systems Corporation, Burnham, IL (US)

( * ) Notice: Subject to any disclaimer, the term of this patent is extended or adjusted under 35 U.S.C. 154(b) by 0 days.

(21) Appl. No.: 15/949,248

(22) Filed: Apr. 10, 2018

(51) Int. Cl.

| | |
|---|---|
| H04N 7/18 | (2006.01) |
| G06Q 30/06 | (2012.01) |
| G06F 17/30 | (2006.01) |
| G06Q 10/08 | (2012.01) |
| G06T 19/00 | (2011.01) |
| G06T 17/00 | (2006.01) |
| H04N 1/21 | (2006.01) |
| H04N 13/282 | (2018.01) |
| B25J 9/16 | (2006.01) |
| G06Q 50/00 | (2012.01) |

(52) U.S. Cl.
CPC ... *G06Q 30/0603* (2013.01); *G06F 17/30572* (2013.01); *G06Q 10/083* (2013.01); *G06Q 30/0643* (2013.01); *G06T 17/00* (2013.01); *G06T 19/006* (2013.01); *H04N 1/2166* (2013.01); *H04N 13/282* (2018.05); *B25J 9/1679* (2013.01); *G06Q 50/01* (2013.01)

(58) Field of Classification Search
CPC .......... G06Q 30/0603; G06Q 30/0643; G06Q 10/083; G06Q 50/01; H04N 13/282; H04N 1/2166; G06T 17/00; G06T 19/006; G06F 17/30572; B25J 9/1679
USPC .......................................... 348/50
See application file for complete search history.

(56) References Cited

U.S. PATENT DOCUMENTS 5,947,051 A * 9/1999 Geiger .................. B62D 57/00
114/222
6,643,626 B1 * 11/2003 Perri de Resende .. G06Q 20/20
705/16

(Continued)

OTHER PUBLICATIONS

Salsify, "Salsify is built for the speed of commerce", Salsify, Inc., Dec. 22, 2017, 8 pages.

*Primary Examiner* — Shan E Elahi
(74) *Attorney, Agent, or Firm* — McDonnell Boehnen Hulbert & Berghoff LLP

(57) ABSTRACT

An example system may include an acquisition system including a robotic manipulator and a camera coupled to the robotic manipulator. The example system may further include one or more network servers storing program instructions that, upon execution by at least one processor of the one or more network servers, cause the one or more network servers to perform various operations. The operations may include: receiving, from a client application operating on a client device, a product visual order; generating a product profile corresponding to the product visual order in a product visual database; transmitting, to the acquisition system, acquisition instructions for acquiring product visual data indicative of the tangible product; transforming captured product visual data into a product visual of the tangible product; and storing the product visual in the product profile.

20 Claims, 10 Drawing Sheets

(56) References Cited

U.S. PATENT DOCUMENTS

| | | | | |
|---|---|---|---|---|
| 7,013,290 | B2* | 3/2006 | Ananian | G06F 17/30867 |
| | | | | 705/26.42 |
| 8,781,882 | B1* | 7/2014 | Arboletti | G06Q 10/0639 |
| | | | | 705/7.11 |
| 8,949,143 | B2* | 2/2015 | Babu | G07G 1/14 |
| | | | | 705/16 |
| 9,076,180 | B2 | 7/2015 | Scott | |
| 2002/0085219 | A1 | 7/2002 | Ramamoorthy | |
| 2003/0028451 | A1* | 2/2003 | Ananian | G06F 17/30867 |
| | | | | 705/26.42 |
| 2004/0015408 | A1* | 1/2004 | Rauen, IV | G06Q 10/10 |
| | | | | 705/26.41 |
| 2007/0172216 | A1 | 7/2007 | Lai | |
| 2008/0246757 | A1 | 10/2008 | Ito | |
| 2009/0150246 | A1* | 6/2009 | Meenakshi | G06Q 20/20 |
| | | | | 705/16 |
| 2010/0150432 | A1 | 6/2010 | Zilli | |
| 2013/0054310 | A1* | 2/2013 | Sickenius | G06Q 30/02 |
| | | | | 705/7.39 |
| 2013/0097664 | A1* | 4/2013 | Herz | G06Q 10/10 |
| | | | | 726/1 |
| 2014/0160293 | A1* | 6/2014 | Ristivojevic | H04N 7/18 |
| | | | | 348/150 |
| 2016/0267759 | A1* | 9/2016 | Kerzner | G08B 13/19645 |
| 2017/0024896 | A1* | 1/2017 | Houghton | G06Q 10/087 |
| 2017/0243403 | A1* | 8/2017 | Daniels | G06F 3/147 |
| 2017/0367771 | A1* | 12/2017 | Tako | A61B 34/20 |
| 2018/0124374 | A1* | 5/2018 | Smith | H04N 13/117 |

* cited by examiner

PLATFORM AND ACQUISITION SYSTEM FOR GENERATING AND MAINTAINING DIGITAL PRODUCT VISUALS

BACKGROUND

In the e-commerce industry, businesses capture different categories of content to sell products online. Examples of the different categories of content include product descriptions, product images, and advanced product visuals such as three-dimensional (3D) models, augmented reality models, and virtual reality models. Each category has its own overhead, process, and standards. The different categories of content are commonly grouped together and referred to as product content.

The process to create, maintain, and organize product content can be expensive, but it is a worthwhile, and arguably necessary, chore to sustain a successful e-commerce business. Accurate and professional-quality product content can sometimes persuade an online shopper to purchase a product. Conversely, poor or inaccurate product content can discourage shoppers from purchasing a product. The curation and management of product content helps keep the multi-billion dollar e-commerce market alive and well.

Some retailers and manufacturers have their own systems for handling the curation and management of product content. In these systems, someone is tasked with keeping the product content up-to-date as products change. At a small scale of one to a hundred products, this process is manageable. However, as the size of the product offerings increases, the process becomes more cumbersome and expensive. In some cases, the costs associated with the curation and management of product content can make it difficult for a business to expand their product offerings. Improvements are therefore desired.

SUMMARY

The embodiments herein involve, but are not limited to, a computer-implemented platform and acquisition system for generating and maintaining product visuals, for use by e-commerce manufacturers, e-commerce retailers, and other parties. In an example system, one or more network servers can host an application that facilitates generating product content for a product, managing product content, and sharing product content with third-parties. A customer can use the application to order a product visual and, upon receiving a product visual order, a network server can direct an acquisition system to capture product visual data. The network server can then transform the captured product visual data into a product visual, and store the product visual in a product profile. Further, using the application, the product profile can be approved and edited by a customer, and shared with third-parties, such as retailers.

In a first example embodiment, a system may include an acquisition system including a robotic manipulator and a camera coupled to the robotic manipulator. The system may further include one or more network servers storing program instructions that, upon execution by at least one processor of the one or more network servers, cause the one or more network servers to perform various operations. The operations may include receiving, from a client application operating on a client device, a product visual order including a customer identifier indicative of a customer, a product identifier indicative of a tangible product, and at least one scan parameter. The client device can be located remotely from the acquisition system. The operations may also include generating a product profile corresponding to the product visual order in a product visual database. The product profile can include the product identifier and be associated with a customer account for the customer. Further, the operations may include transmitting, to the acquisition system, acquisition instructions for acquiring product visual data indicative of the tangible product in accordance with the at least one scan parameter, with reception of the acquisition instructions by the acquisition system causing the robotic manipulator to adjust a position the camera and causes the camera to capture the product visual data. Still further, the operations may include transforming the captured product visual data into a product visual of the tangible product, and storing the product visual in the product profile.

In a second example embodiment, a computer-implemented method may involve receiving, by one or more network servers from a client application operating on a client device, a product visual order including a customer identifier indicative of a customer, a product identifier indicative of a tangible product, and at least one scan parameter. The client device can be located remotely from the acquisition system that is configured to generate product visuals. The computer-implemented method may also involve generating, by the one or more network servers, a product profile corresponding to the product visual order in a product visual database. The product profile can include the product identifier and be associated with a customer account for the customer. Further, the computer-implemented method may involve transmitting, by the one or more network servers, acquisition instructions to the acquisition system for acquiring product visual data indicative of the tangible product in accordance with the at least one scan parameter, with reception of the acquisition instructions by the acquisition system causing a robotic manipulator of the acquisition system to adjust a position of a camera of the acquisition system and causes the camera of the acquisition system to capture the product visual data. Still further, the computer-implemented method can involve transforming, by the one or more network servers, the captured product visual data into a product visual of the tangible product, and storing the product visual in the product profile.

In a third example embodiment, an article of manufacture may include a non-transitory computer-readable medium, having stored thereon program instructions that, upon execution by one or more computing devices, cause the one or more computing devices to perform operations in accordance with the second example embodiment.

In a fourth example embodiment, a system may include various means for carrying out each of the operations of the second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
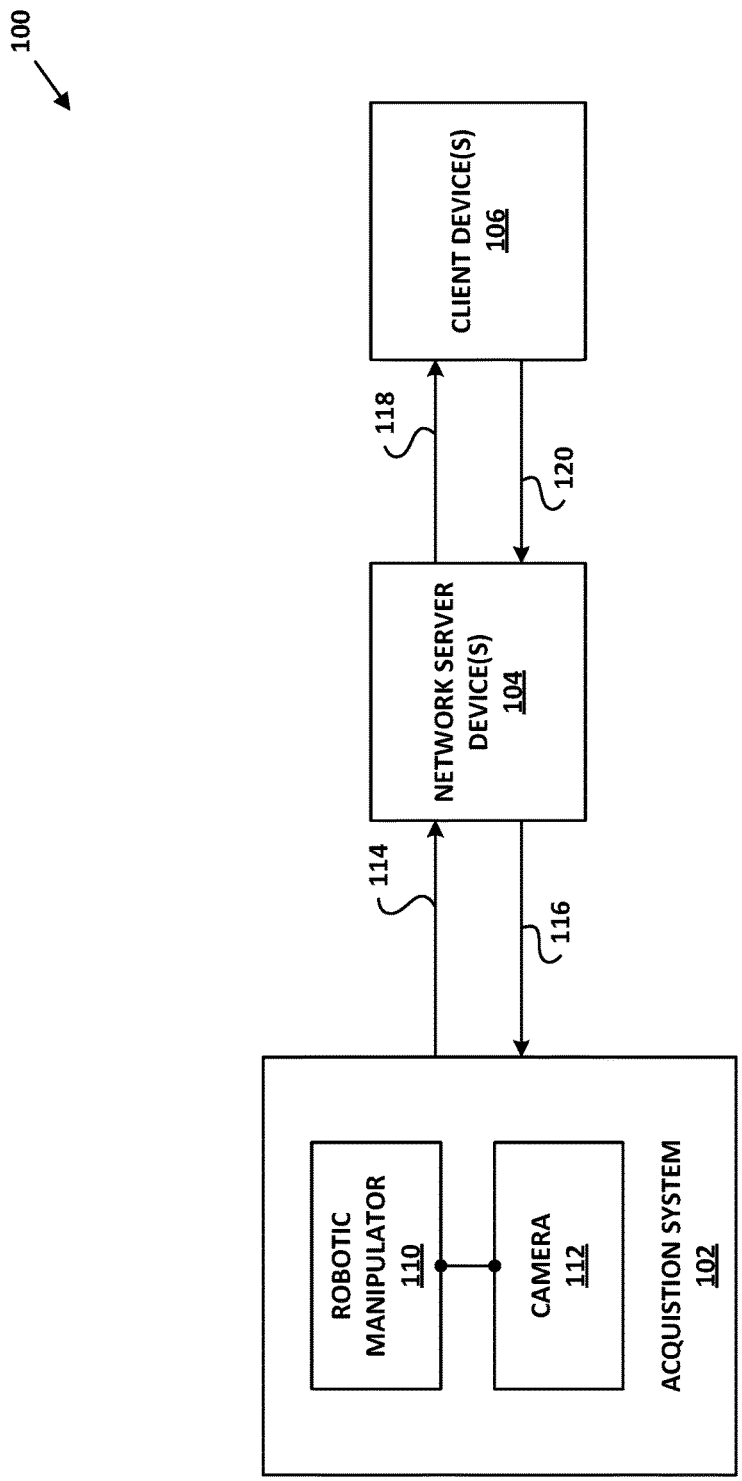
FIG. 1 is a high-level depiction of a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, use of the terms "maximum" and "minimum" herein refer to a desirable outcome to achieve, but do not imply that the outcome must be achieved. For instance, a goal of a function may be to select a maximum or minimum value, but there is no guarantee that the value selected is actually a maximum or minimum. Instead, the value selected may be close to a maximum or minimum value (e.g., within a threshold extent), or the function may take steps that are expected to result in a maximum or minimum value, but may not achieve this goal in all situations. Thus, any sort of optimization described herein may be in the statistical sense, and an actual optimal outcome is not required.

1. Overview

The e-commerce industry is still relatively young, and many retailers are still looking for an easy, standardized way to handle the curation and management of product content. In some situations, retailers source product visuals and product information from manufacturers, or create their own product visuals in-house. Whenever a product is updated, the retailer then waits for new product visuals from the manufacturer, or creates new product visuals using their in-house equipment, and updates the product information.

As noted above, for small-scale retailers offering a limited number of products, these approaches may be manageable. Unfortunately, however, for a retailer selling hundreds or thousands of products, the task of updating product visuals and product information is time consuming and expensive. In some cases, the costs associated with the curation and management of product content can make it difficult for a business (e.g., a manufacturer or a retailer) to expand their product offerings.

The embodiments herein support methods, devices, and systems that solve these and other issues by providing a computer-implemented platform and acquisition system for creating and managing product content. In an example system, one or more network servers can host one or more applications that facilitate generating product content for a product, managing product content, and/or sharing product content with third-parties.

With regards to generating product content, a network server can be configured to host a client application that a customer, such as a manufacturer, can access using a client device. Using the client application, the customer can, for example, order a product visual for a tangible product, and specify one or more scan parameters, such as a model type or product size. Upon receiving the order, the network server can generate a product profile corresponding to the order. As discussed more fully below, the product profile can be associated with a customer account of the customer, and can be accessible by the customer using the client application. Further, in response to receiving the order, the network server can provide instructions to an acquisition system that causes the acquisition system to acquire product visual data indicative of the tangible product in accordance with the scan parameter. Product visual data captured by the acquisition system can then be uploaded to a database that is accessible by the network server. The network server can transform captured product visual data into a product visual, and store the product visual in the product profile.

In some examples, the acquisition system can be located remotely from the customer and the client device, and the customer can ship the tangible product to a location of the acquisition system. In other examples, the acquisition system can be located on the customer's premises, but controlled by a network server located remotely from the acquisition system.

With regards to managing product content, the network server could also be configured to a host a client application that a customer, such as a manufacturer, can access to manage product content. For instance, using a client device, the customer can access the client application to review/approve product visuals or to update product information of a product profile.

Further, with regards to sharing product content, a customer, such as a manufacturer, can access a client application to share a product profile. As one example, using a client device, the customer can request to share a product profile privately with one or more particular third-parties, such as one or more retailers. A network server can then share the product profile with the particular third-parties, who, in turn, can access the product profile using a third-party device. In this manner, the platform provides a streamlined way of communicating product content to third-parties. As another example, the customer can request to share a product profile publicly with a plurality of users of the platform, and the network server can provide the plurality of users with access to the product profile.

Other examples are also possible and discussed hereinafter.

Advantageously, this automated solution for creating and managing product visuals can save customers time and effort. For manufacturers, the platform helps to ease the burdensome task of gathering and sharing product content. And for retailers, the platform provides access to a database of product content where retailers can select product content for integration into their digital product catalogs and existing e-commerce platforms.

Further, for a manufacturer or a retailer, using such a computer-implemented platform to create and manage product visuals can also be more cost effective than other approaches, such as sourcing product visuals from outside vendors or generating product visuals in-house.

2. Example Computing Devices and Architectures

FIG. 1 illustrates an example system 100. As depicted in FIG. 1, system 100 may include an acquisition system 102 and one or more computing devices, such as one or more network server devices 104 and one or more client devices 106. Herein, a "computing device" may refer to a client device, a server device (e.g., a stand-alone server computer or networked cluster of server equipment), or some other type of computational platform.

Acquisition system 102 includes a robotic manipulator 110 and a camera 112 coupled to the robotic manipulator 110. Robotic manipulator 110 can include one or more arms mounted to a base, with the base being stationary or movable. Robotic manipulator 110 can also include one or more actuators that are controllable to move the one or more arms, and one or more sensors configured to provide feedback regarding the state (e.g., position) of robotic manipulator 110. Further, robotic manipulator 110 can include one or more actuators configured to pan or tilt camera 112.

Camera 112 can be configured to capture two-dimensional (2D) data or images and can have various configurable parameters, such as aperture, shutter speed, sensitivity to light (e.g., ISO sensitivity), and/or zoom. Camera 112 can also be configured to capture 3D data or images. For instance, camera 112 can be configured to generate a point cloud or capture RGBD images (e.g., RGB images augmented with depth information (i.e. distance "D" to sensor) on a per-pixel or group of pixel basis).

Acquisition system 102 can also include one or more lighting elements. The lighting elements can be individually controllable to cause illumination from various illumination positions with various illumination intensities. In one example, the lighting elements can include one or more strips and/or arrays of light-emitting diodes.

Acquisition system 102 can also include a control system for controlling robotic manipulator 110 and camera 112. The control system may include at least one processor that executes instructions stored in a non-transitory computer readable medium. The control system may also represent one or more computing devices that may serve to control individual components or subsystems of acquisition system 102.

Additionally or alternatively, acquisition system 102 can include a communication interface through which robotic manipulator 110 and camera 112 may be controlled by a remote computing device, such as network server device 104. As shown in FIG. 1, acquisition system 102 can transmit data 114 to and/or receive data 116 from network server device 104.

Network server device 104 may be any type of server device configured to carry out the network server operations described herein. Network server device 104 may be configured to send data 116 to and/or receive data 114 from acquisition system 102. As an example, network server device 104 may be configured to send to acquisition system 102 acquisition instructions and to receive from acquisition system 102 captured product visual data. In addition, network server device 104 may be configured to send data 118 to and/or receive data 120 from client device 108. As an example, network server device 104 can be configured to receive a product visual order from client device 106 and to transmit a product visual to client device 106.

Client device 106 may be any type of device including a personal computer, laptop computer, a wearable computing device, a wireless computing device, a head-mountable computing device, a mobile telephone, or tablet computing device, etc., that is configured to send data 120 to and/or receive data 118 from network server device 104 in accordance with the embodiments described herein. For example, client device 106 may be configured to send a product visual order to network server device 104, to send sharing requests to network server device 104, and/or to receive a product visual from network server device 104.

In the system 100 of FIG. 1, network server device 104 may communicate with acquisition system 102 and client device 106 via one or more wireline or wireless interfaces.

In one example, the acquisition system 102 may incorporate the network server device 104 (not shown). For instance, the network server device 104 may be a computing device of the acquisition system 102. Regardless of the exact architecture, the operations of the network server device 104, as well as any other operation associated with the architecture of FIG. 1, can be carried out by one or more computing devices. These computing devices may be organized in a standalone fashion, in cloud-based (networked) computing environments, or in other arrangements.

Figure 2:
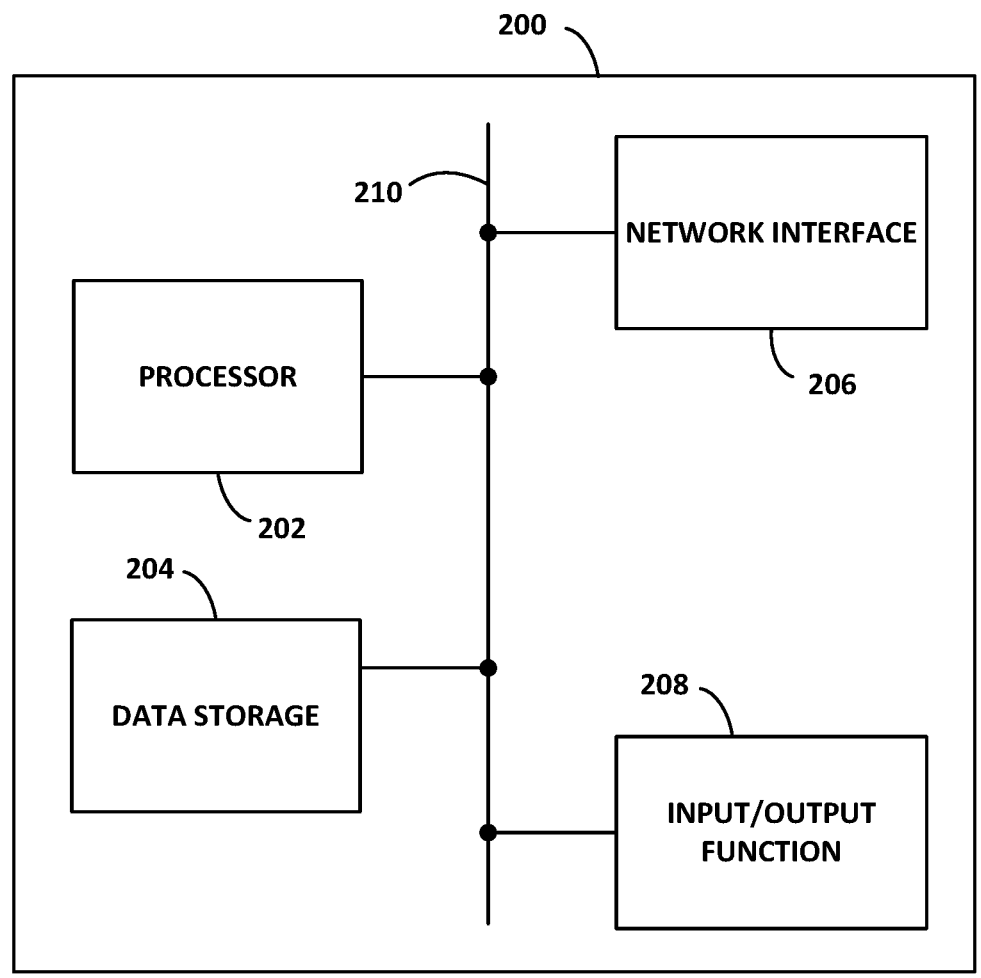
FIG. 2 illustrates a schematic drawing of a computing device, according to an example embodiment.

FIG. 2 is a simplified block diagram representing a computing device 200, illustrating some of the functional components that could be included in a computing device arranged to operate in accordance with the embodiments herein. Example computing device 200 could be a control system, a client device, a server device, or some other type of computational platform. For purpose of simplicity, this specification may equate computing device 200 to a server from time to time. Nonetheless, the description of computing device 200 could apply to any component used for the purposes described herein.

In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits (ASICs), digital signal processors (DSPs), network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or operations described herein. Alternatively, these methods, processes, or operations can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or operations disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

Computing device 200 may represent any control system, client device, server device, or other device depicted in any of the drawings herein.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
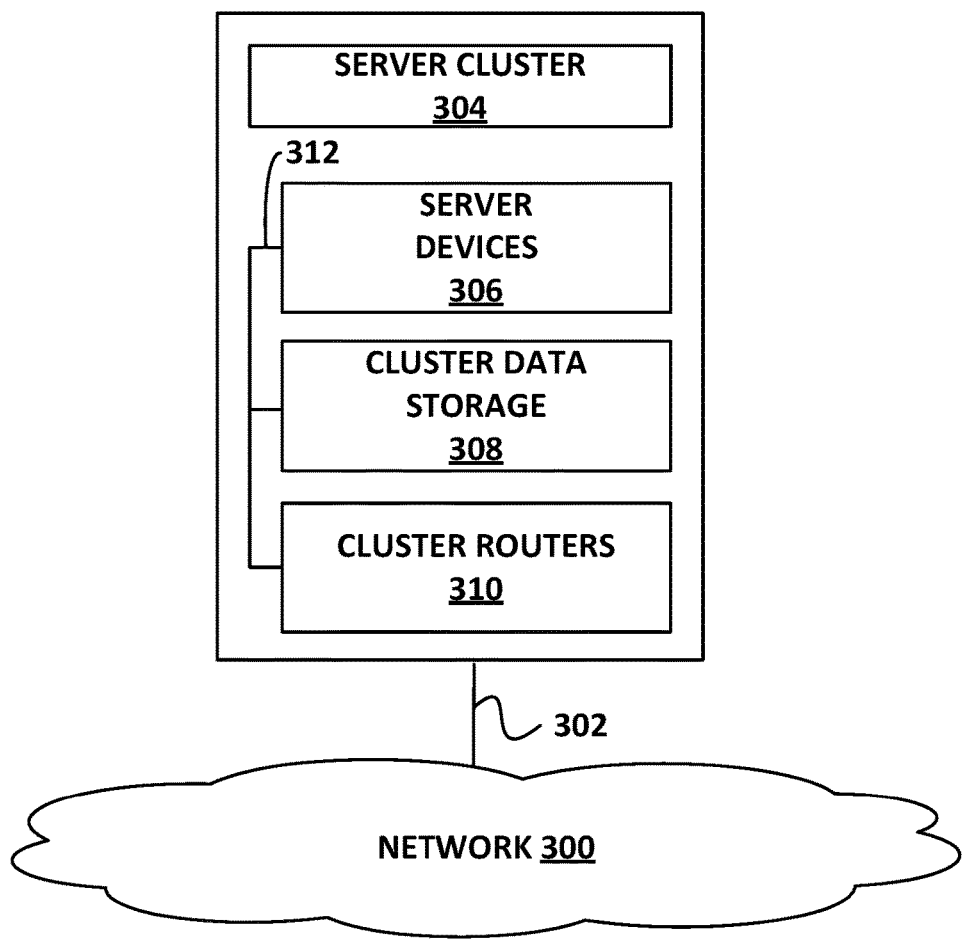
FIG. 3 illustrates a schematic drawing of a networked server cluster, according to an example embodiment.

FIG. 3 depicts a cloud-based server cluster 304 in accordance with an example embodiment. In FIG. 3, functions of a server device, such as network server device 104 (as represented by computing device 200) may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result. For purpose of simplicity, both server cluster 304 and individual server devices 306 may be referred to as "a server device." This nomenclature should be understood to imply that one or more distinct server devices, data storage devices, and cluster routers may be involved in server device operations.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

As a possible example, cluster data storage 308 may include any form of database or data storage, such as a structured query language (SQL) database or data storage or a non-structured query language (NoSQL) database or data storage. Various types of data structures may store the information in such a data storage system, including but not limited to tables, arrays, lists, trees, and tuples. Furthermore, any databases in cluster data storage 308 may be monolithic or distributed across multiple physical devices.

Server devices 306 may be configured to transmit data to and receive data from cluster data storage 308. This transmission and retrieval may take the form of SQL queries or other types of database queries, and the output of such queries, respectively. Additional text, images, video, and/or audio may be included as well.

In line with the discussion above, server devices 306 can be configured to remotely host one or more applications and make the applications available to other computing devices, such as client devices or third-party devices over a network (e.g., the Internet). By way of example, server devices 306 can host a client application, and allow remote access to the client application. A client device may remotely access the client application using a web-based application, such as an application that communicates with the server devices 306 using the Hypertext Transfer Protocol (HTTP).

3. Example Acquisition System

Figure 4A:
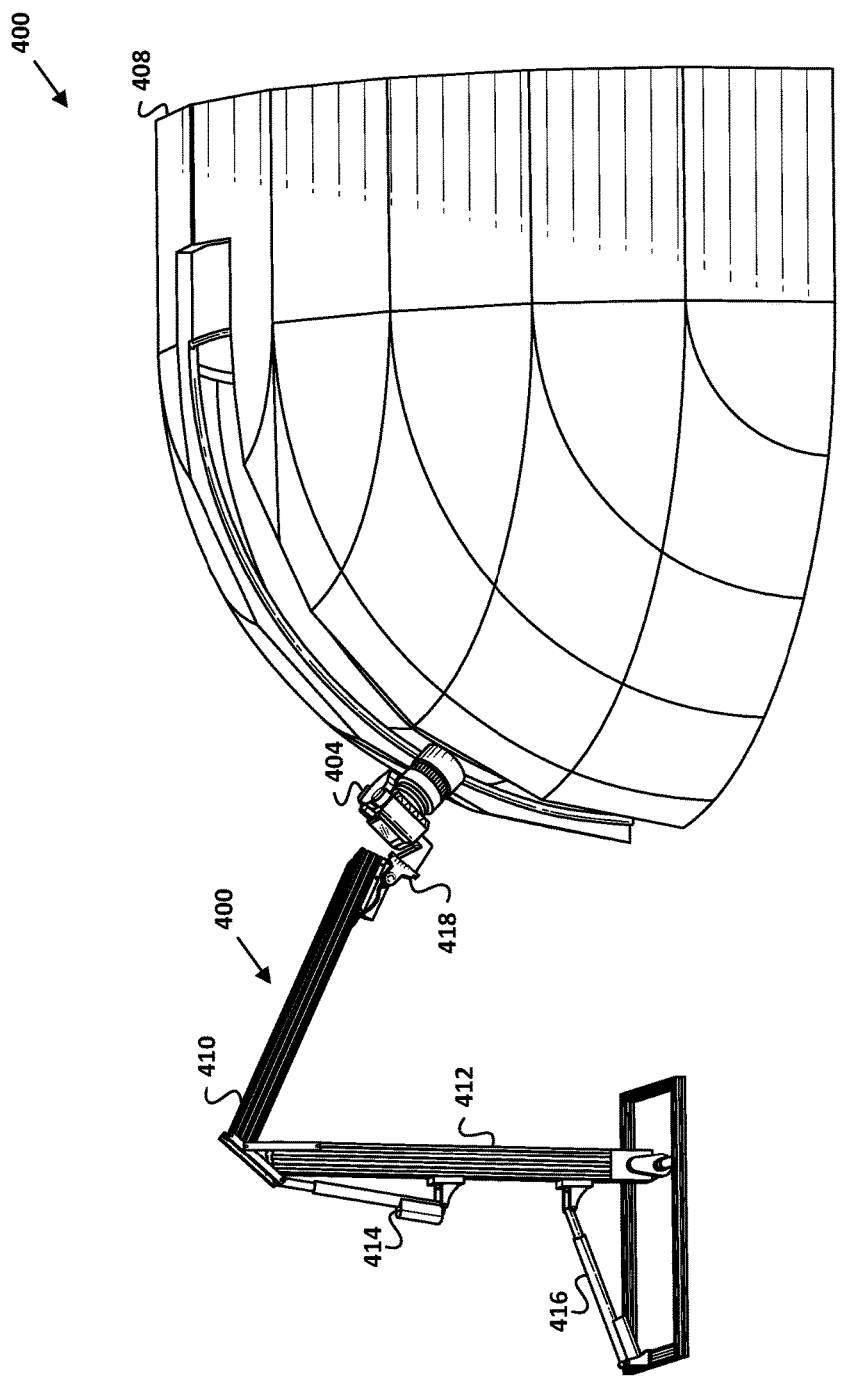
FIG. 4A is a side view of an acquisition system, according to an example embodiment.
Figure 4B:
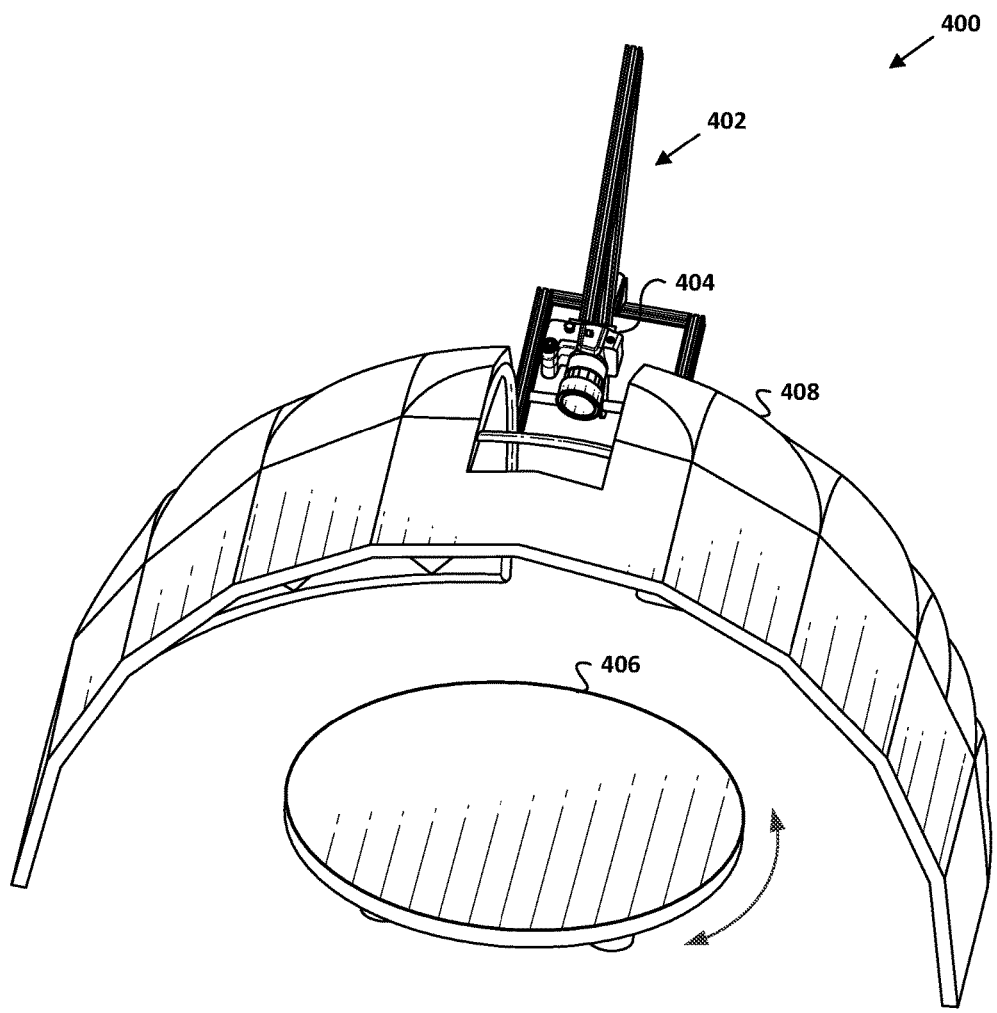
FIG. 4B is a perspective view of the acquisition system of FIG. 4A.

FIGS. 4A and 4B illustrate an example acquisition system 400. Acquisition system 400 includes a robotic manipulator 402, a camera 404, a rotatable turntable 406, and a lighting wall 408.

Robotic manipulator 402 includes a first arm 410 and a second arm 412 that are controllable by a first actuator 414 and a second actuator 416, respectively. In particular, first actuator 414 and second actuator 416 can be controlled so as to move camera 404 closer to and further away from a tangible product positioned on the rotatable turntable 406 and to raise and lower camera 404 vertically. Robotic manipulator 402 also includes one or more third actuators 418 that can be controlled so as to tilt camera 404 up, down, left, and right and to pan camera 404 up, down, left, and right. The example configuration of robotic manipulator 402 is not meant to be limiting. Other robotic manipulators can be configured in other manners as well. For instance, a robotic manipulator can have six joints and six degrees of freedom.

Camera 404 can be configured to capture data indicative of a tangible product positioned on the rotatable turntable 406. Camera 404 can transmit images or raw image data to a network server device using a wired or wireless interface. In some instances, camera 404 may transmit images or raw image data to a computing device that, in turn, forwards the transmitted images or raw image data to a network server device. The images and/or raw image data can include 2D data and/or 3D data.

Rotatable turntable 406 can be controlled so as to rotate 360 degrees in either direction. For instance, a motor of rotatable turntable 406 can be controlled so as to cause rotatable turntable 406 to rotate clock-wise or counter-clockwise around a central axis.

Lighting wall 408 includes a plurality of individually controllable lighting elements. As shown in FIGS. 4A and 4B, lighting wall 408 can be configured as a partial dome including a plurality of panels. Each of the panels can include an array of individually controllable lighting elements. A controller can cause various lighting elements of various lighting panels to illuminate with various intensities in order to provide a desired amount of lighting from a desired direction(s).

In some examples, the acquisition system 400 can include a second robotic manipulator that is configured to grab tangible products and position the tangible products on rotatable turntable 406. For instance, the second robotic manipulator could be controllable so as to grab a tangible product from a staging area, position the tangible product on rotatable turntable 406, and to then remove the tangible product from rotatable turntable 406 after camera 404 captures one or more images or image data indicative of the tangible product.

4. Example Client Application User Interface

Figure 5:
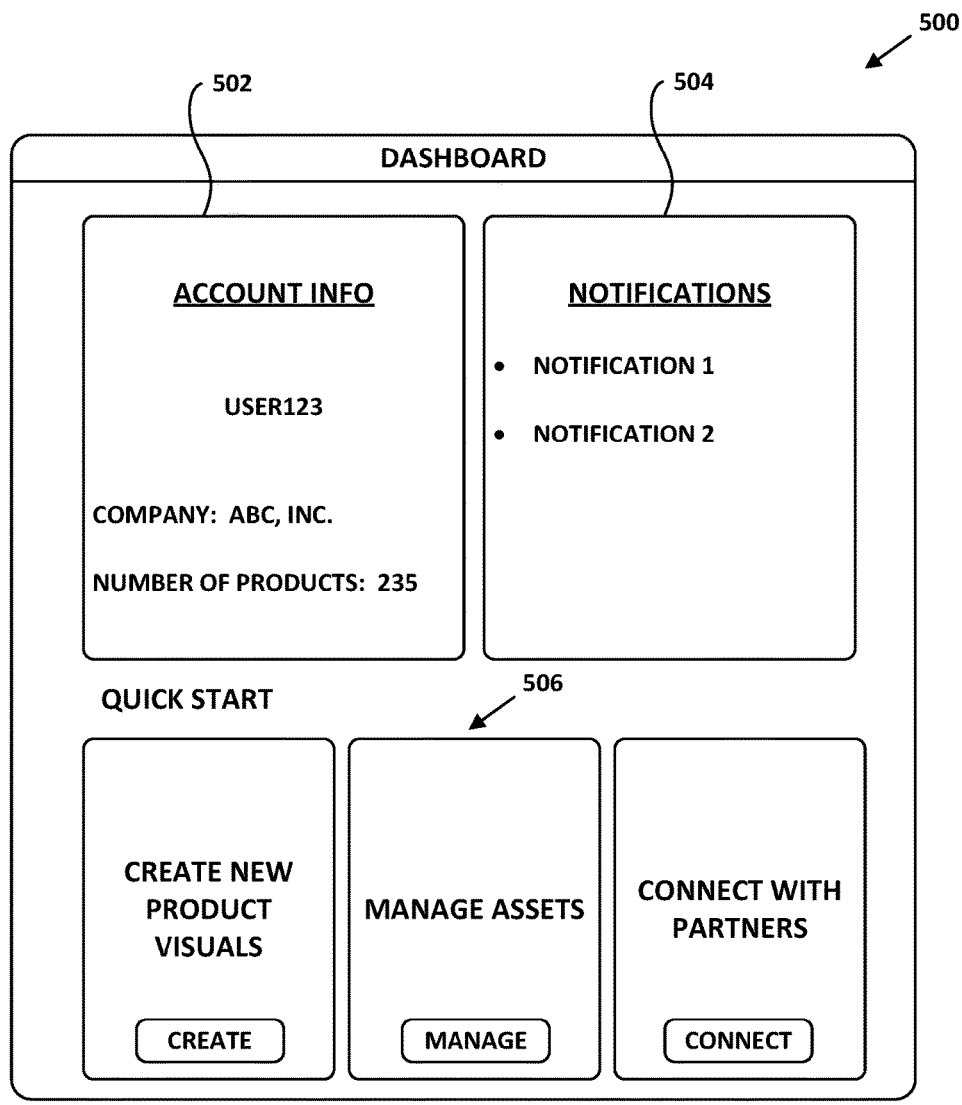
FIG. 5 illustrates a user interface of a client application, according to an example embodiment.

FIG. 5 illustrates an example user interface 500 of a client application. User interface 500 shows various user interface items that may be presented to a customer via a client application. As shown in FIG. 5, user interface 500 includes an account information item 502, a notifications item 504, and quick start items 506.

The account information item 502 provides a summary of a customer's account, including a username, company identifier, and product count. The product count may indicate the number of products in the customer's digital product catalog.

The notifications item 504 shows notifications for the customer. Notifications in the notifications item 504 may, for instance, include notifications of product visuals that are available for review and/or notifications of product profiles that have been shared with the customer.

The quick start items 506 include different user selectable items that can be selected by a customer to perform different actions, namely, creating new product visuals, managing assets, and connecting with partners. After receiving a selection of a particular quick start item, the client application may prompt the customer to provide additional information. For instance, after receiving data indicative of a selection of the "Create new product visuals" item, the client application may prompt the customer to provide a product identifier indicative of a tangible product and at least one scan parameter. In line with the discussion above, the at least one scan parameter could include one or more model types, such as a 3D model, a 360-degree model, a virtual reality model, and/or an augmented reality model. The at least one scan parameter could also include a size of the tangible product (e.g., height, width, depth).

5. Example Client Operations

Figure 6:
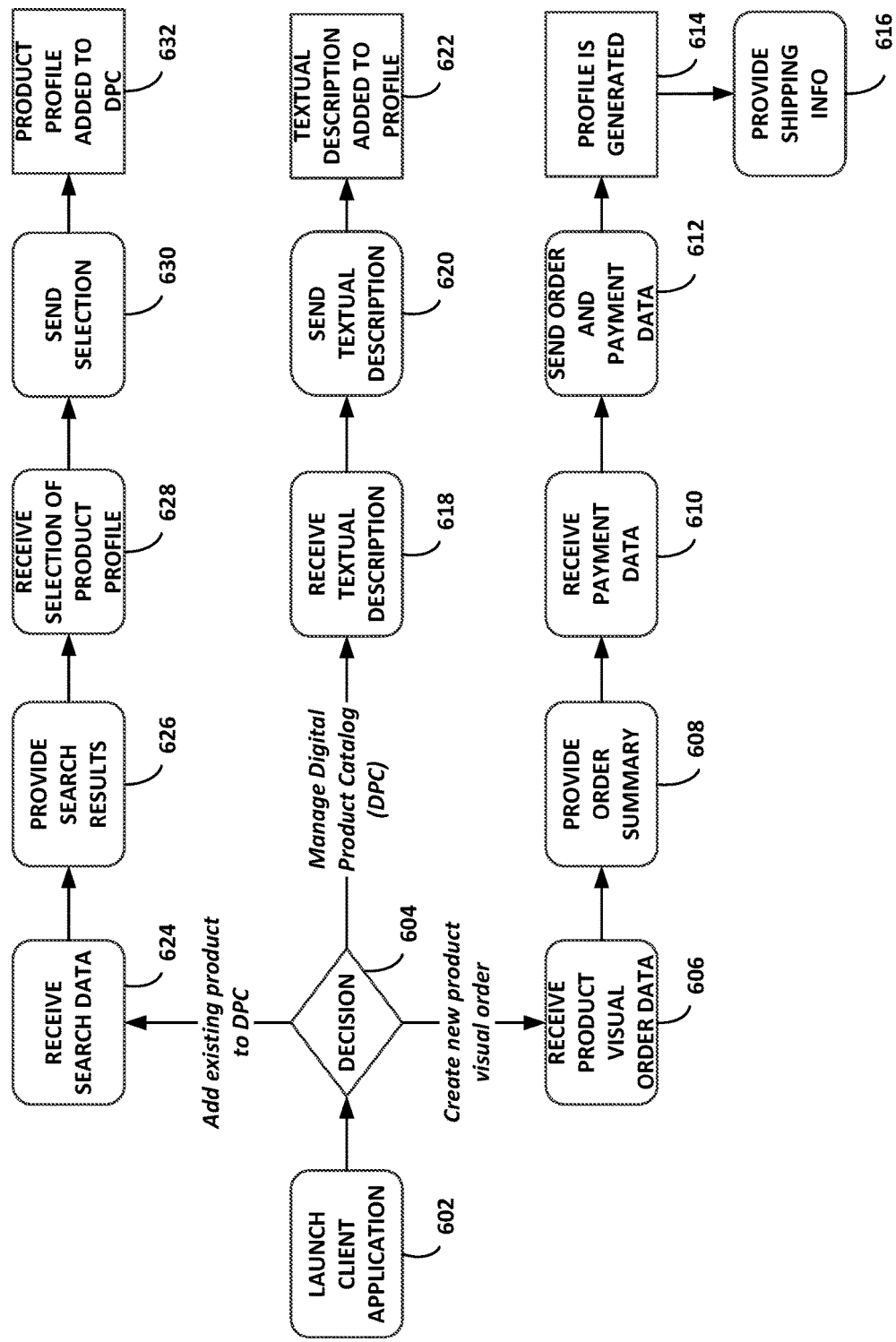
FIG. 6 depicts a flow chart, according to an example embodiment.

FIG. 6 depicts a flow chart illustrating an example embodiment. In particular, FIG. 6 shows various operations that could be performed by a client device that is executing a client application.

At block 602, the client device launches a client application. In line with the discussion, client application could be a web-based application that is hosted by a network server device. At block 604, the client device determines which of multiple actions to perform. The client device may make the decision based on data indicative of a user interface selection. If the decision at block 604 is to create a new product visual order, then, at block 606, the client device can receive product visual order data. For instance, client device can provide a form that a customer fills out, thereby identifying various information about a tangible product. By way of example, a manufacturer may input information such as a size, name, UPC code, description, etc., for a tangible product. The manufacturer can also indicate a model type, such as, 3D model, 360-degree model, augmented reality model, or virtual reality model. Further, the manufacturer could indicate a desired pose or poses for the tangible product. The tangible product could be a water bottle, an item of clothing, an electronic device, or another product.

At block 608, the client device can provide for display an order summary. The order summary may include the information provided by the customer, as well as a customer identifier indicative of the customer.

At block 610, the client device can prompt the customer to select a payment plan and provide payment data. And at block 612, the client device can send a product visual order and payment data to a network server device. The product visual order can include the customer identifier, a product identifier indicative of the tangible product, and at least one scan parameter. In response to receiving the order, the network server device can, at block 614, generate a product profile corresponding to the product visual order. The product profile can include the product identifier and can be associated with a customer account for the customer. If product information is known by the network server device, the product profile can include any product information about the tangible product. After a product visual is created, the product visual can be added to the product profile as well.

At block 616, the client device can provide for display shipping information. The shipping information can specify a destination to which the tangible product is to be shipped, such as a location of an acquisition system that is configured to capture product visual data.

On the other hand, if the decision at block 604 is to manage a digital product catalog, then, at block 618, the client device can receive a textual description of a tangible product to be added to a product profile. The textual description could include a name, features, specifications, etc. The client device can also receive a selection of the product profile. For instance, the client device can provide for display a list of product profiles, and receive a selection of one of the product profiles. Or the client device can receive a product identifier of a particular product profile. Subsequently, at block 620, the client device can send the textual description and the product identifier to a network server device. And, at block 622, the network server device can add the textual description to the product profile for the tangible product.

Further, if the decision at block 604 is to add an existing product to a customer's digital product catalog, then, at block 624, the client device can receive search data. For example, the client device can provide a search form, and a customer can input various search criteria. At block 626, the client device can then provide search results matching the search data. In one example, providing the search results can include sending the search data to a network server device and receiving from the network server device the search results. The search results can include a list of product profiles.

At block 628, the client device can receive a selection of a product profile from among the search results. At block 630, the client device can send data indicative of the selected product profile to a network server device. For instance, the client device can send a product identifier of a tangible product to the network server device. In response to receiving the selection, the network server device can then add the product profile to the digital product catalog at block 632. The client device or the network server device could also bill the customer for adding the product profile to the digital product catalog.

6. Example Server Operations

Figure 7:
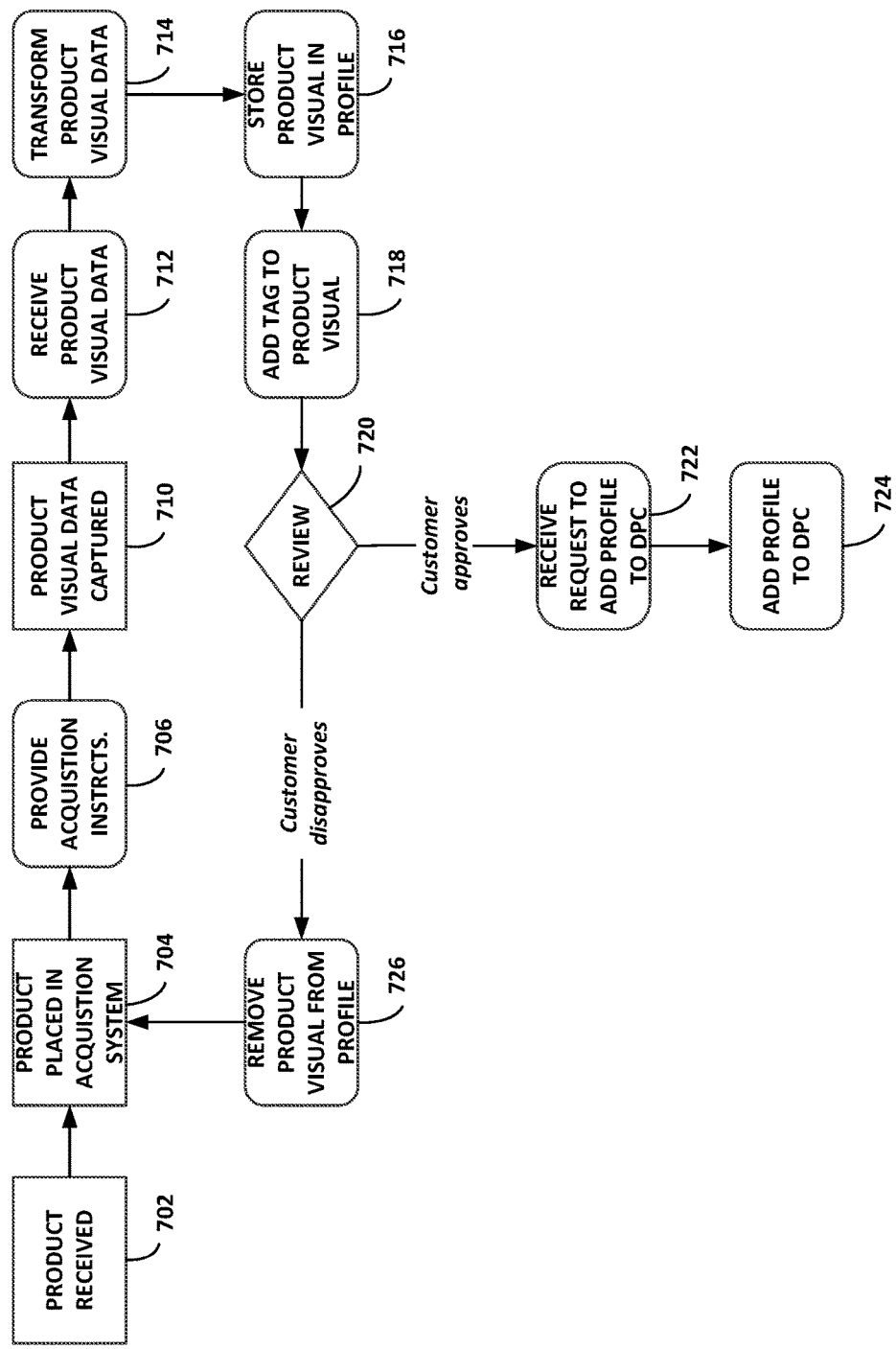
FIG. 7 depicts another flow chart, according to an example embodiment.

FIG. 7 depicts another flow chart illustrating an example embodiment. In particular, FIG. 7 shows various operations that could be performed by a network server device.

Prior to performing these operations, at block 702, a tangible product is received at a location of an acquisition system, and, at block, 704, the tangible product is placed in the acquisition system. The acquisition system could be any of the acquisition systems disclosed herein.

At block 706, the network server device provides acquisition instructions for acquiring product visual data indicative of the tangible product to the acquisition system in accordance with at least one scan parameter. In some examples, the network server device can provide the acquisition instructions in response to receiving confirmation that the tangible product has been placed in the acquisition system. For instance, after placing the tangible product on a rotatable turntable, an operator could send to the network server device a product identifier of the tangible product. The network server device could then use the product identifier to look up the product profile, and retrieve information about a product visual order. Further, the retrieved information could include at least one scan parameter, and the network server device could use the at least one scan parameter to generate the acquisition instructions.

In one example, the network server device can generate the acquisition instructions based on a scan parameter that is indicative of a size of the tangible product. For instance, the network server device can determine, based on the size of the tangible product, a desired distance between the tangible product and the camera. The desired distance could be determined by mapping a dimension of the object (e.g., height or width) to a corresponding distance using a mapping table. The acquisition instructions can then include instructions for causing a robotic manipulator to move the camera such that the distance between the camera and the tangible product is the desired distance. Additionally or alternatively, the network server device can use information indicative of a size of the tangible product to generate acquisition instructions for adjusting configurable parameters, such as aperture, shutter speed, sensitivity to light (e.g., ISO sensitivity), and/or zoom, of the camera and/or acquisition instructions for adjusting illumination intensities of one or more lighting elements.

Further, the at least one scan parameter could indicate a desired number of images, and the network server device could provide acquisition instructions for capturing the desired the number of images.

In some examples, the at least one scan parameter could include one or more desired poses of the tangible product. Generating the acquisition instructions could then involve generating instructions for adjusting a position of the camera and/or a rotatable turntable so as to cause the acquisition system to capture data in accordance with the desired poses of the tangible product.

Reception of the acquisition instructions can cause a camera of the acquisition system to capture product visual data indicative of the tangible product at block 710. In some examples, capturing product visual data indicative of the tangible product can involve receiving sensor-feedback data from one or more sensors and adjusting configurable parameters of the camera based on the received sensor-feedback data. For instance, the acquisition system can receive sensor-feedback data indicative of a distance between the camera and the tangible product and an intensity of light in in an environment of the acquisition system. From this received sensor-feedback data, a control system of the acquisition system (or the network server device) can select a corresponding f-stop, shutter speed, and aperture for the camera. The sensor-feedback data could be captured by the camera or captured by separate sensors of the acquisition system.

At block 712, the network server device can receive the captured product visual data from the acquisition system. For instance, the acquisition system can upload to the network server device captured 2D data, 2D images, 3D data, and/or 3D images.

At block 714, the network server device transforms the captured product visual data into at least one product visual of the tangible product. The product visual could be a 2D image or a group of 2D images. Alternatively, the product visual could be a 360-degree model, a 3D model, an augmented reality model and an associated viewing configuration, or a virtual reality model and an associated viewing configuration. In one example, a scan parameter included in the product visual order may specify at least one model type, and the network server device can transform the captured product visual data into a particular model type in accordance with the specified at least one model type. In some instances, the scan parameter may specify two or more model types, and the network server device can transform the captured product visual data into the two or more specified model types.

Transforming the captured product visual data into a product visual could involve adjusting brightness and/or saturation. Transforming the captured product visual data into a 360-degree model could also involve combining information from multiple 2D images and/or 3D images to create the 360-degree model. Further, transforming the captured product visual data into a product visual could involve generating an associated viewing configuration for the product visual. For an augmented reality model, the associated viewing configuration could include lighting information, shading information, or both that facilitate display of the augmented reality model by an augmented reality device. Similarly, for a virtual reality model, the associated viewing configuration could include lighting information, shader information, or both that facilitate display of the virtual reality model by a virtual reality device.

In some examples, transforming the captured product visual data into a product visual could involve using machine learning processes to post-process the captured product visual data. As one example, a machine learning process can be used to remove a background from an image. As another example, a machine learning process can be used to crop an image to a standard size. As another example, a machine learning process can be used to smooth 3D point cloud data. As still another example, a machine learning process can be used to stitch images to 3D point cloud data.

One of ordinary skill in the art will appreciate that any of the machine learning processes could be implemented in various ways. In one approach, a machine learning model could be trained using a training set of data. For a background removal process, the training set could include a plurality of images of tangible products, including images having a background and images having backgrounds removed for respective tangible products. The machine learning model could be a convolution neural network, for instance. Other examples are also possible.

Further, at block 716, the network server device can store the product visual for the tangible product in the product profile corresponding to the tangible product. Still further, at block 718, the network server device can add an identifier tag to the product visual for analytics and tracking purposes. In some examples, a machine learning process can be used to add one or more attributes or identifier tags to the product profile. By way of example, for a tangible product in the form of a green water bottle, machine learning can be used to automatically categorize the product through tags. More specifically, a machine learning process could recognize that the item is a bottle (e.g., using an object identification machine learning model) and colored green, generate a textual description (e.g., "green water bottle"), and add the generated textual description to product textual information associated with a product profile for the tangible product. In another example, a machine learning process could recognize a label or logo on a tangible product (e.g., "GMO-Free"), and list this attribute in the product profile.

After storing the product visual in the product profile, the network server device can notify the customer that the product visual is available for review and, at block 720, the customer can review the product visual using a client application. If the customer approves of the product visual then, at block 722, the network server device could also receive, from a client device executing the client application, a request to add the product profile to a digital product catalog associated with the customer's account. In response to receiving the request, at block 724, the network server device can add the product profile to the digital product catalog. Whereas, if the customer does not approve the product visual, the network server device could receive a request to delete the product visual, and, at block 726, responsively remove the product visual from the product profile.

Figure 8:
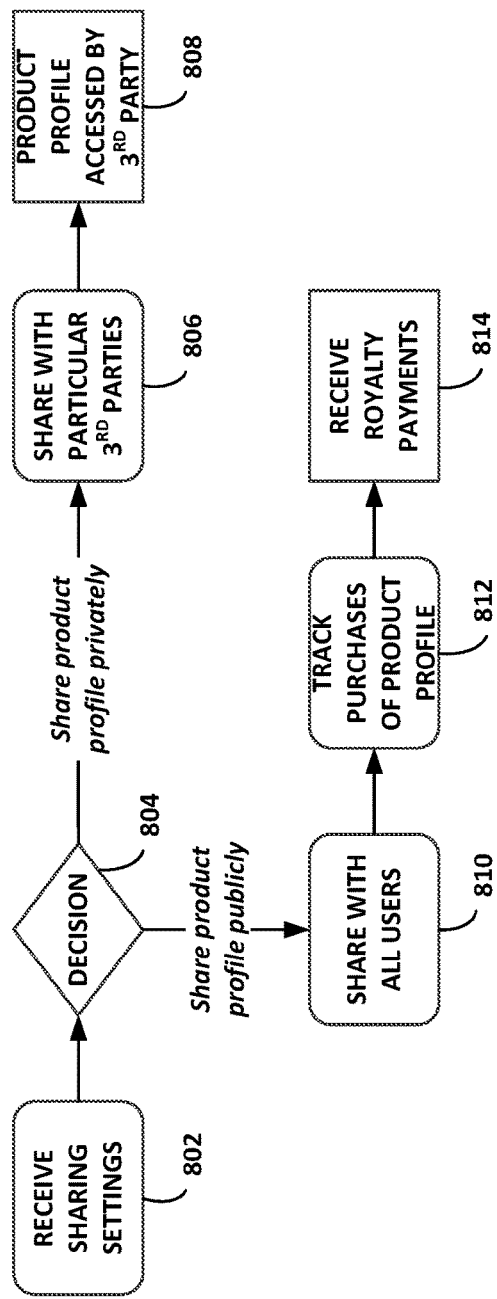
FIG. 8 depicts another flow chart, according to an example embodiment.

FIG. 8 depicts another flow chart illustrating an example embodiment. In particular, FIG. 8 shows additional operations that could be carried out by a network server device. In line with the discussion above, a customer, such as a manufacturer, can manage their product content using a client application. More specifically, the customer can adjust sharing settings for one or more product profiles. In one example, a customer may share a product profile with all of the users that have accounts on a platform provided by the network server device. With this approach, the customer could receive royalties anytime another user purchases product visuals of the product profile. In another example, a customer may share a product profile privately with one or more particular third-parties.

As shown in FIG. 8, at block 802, a network server device can receive sharing settings for a particular product profile. At block 804, the network server device can make a decision depending on the received sharing settings. If the decision is to share the product profile privately with particular third-parties, then, at block 806, the network server device can share the product profile with the particular third-parties. The received sharing settings may indicate customer identifiers of each of the particular third-parties. Subsequently, at block 808, the particular third-parties can access the product profile by, for example, using a client application executing on a client device.

On the other hand, if the decision is to share the product profile publicly, then, at block 810, the network server device can share product profile with all users. Further, at block 812, the network server device can track purchases of the product profile. And at block 814, for any purchases of the product profile, the customer could receive a royalty payment.

7. Additional Example Operations

Figure 9:
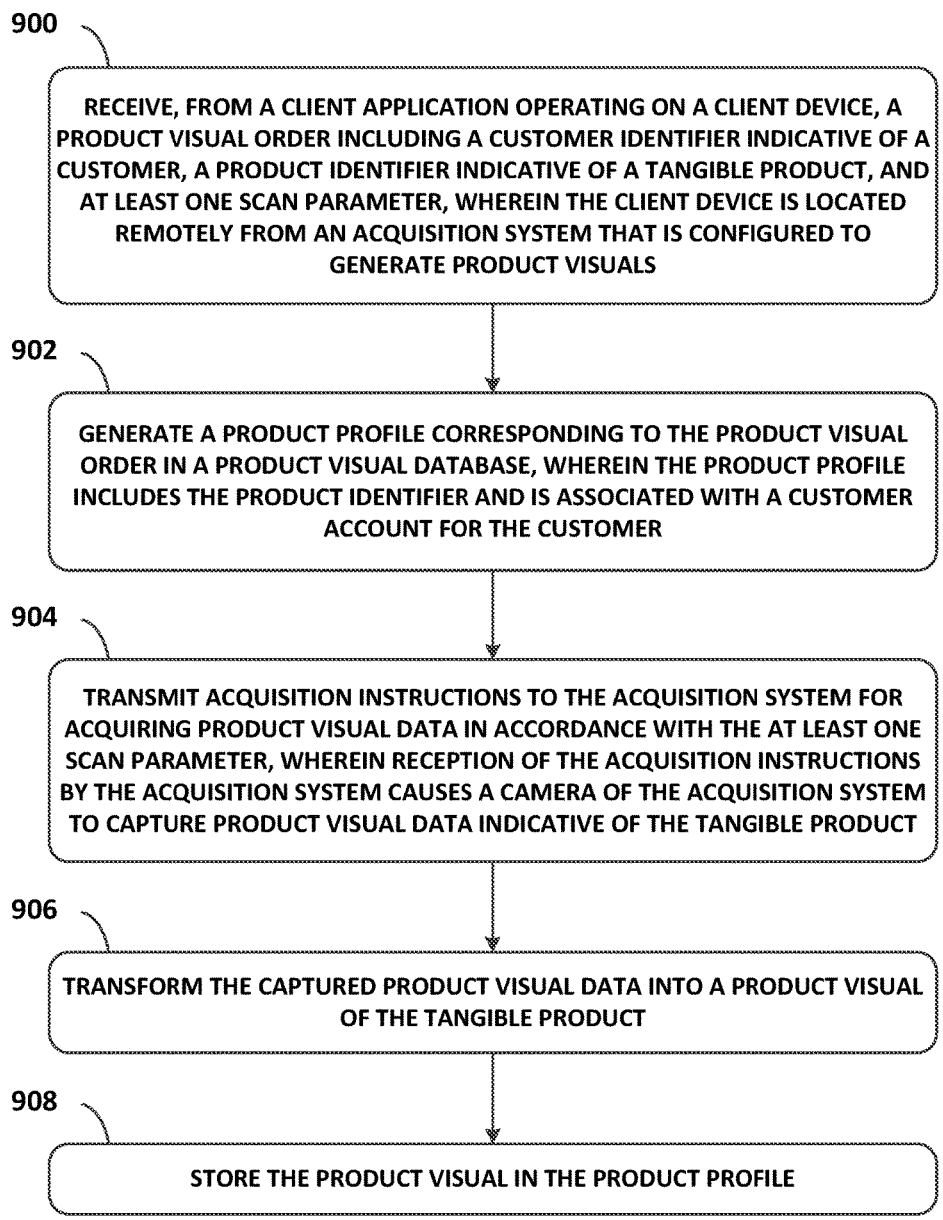
FIG. 9 depicts another flow chart, according to an example embodiment.

FIG. 9 is a flow chart illustrating an example embodiment. The process illustrated by FIG. 9 may be carried out by a computing device, such as computing device 200, and/or a cluster of computing devices, such as server cluster 304. However, the process can be carried out by other types of devices or device subsystems. For example, the process could be carried out by a portable computer, such as a laptop or a tablet device.

Block 900 may involve receiving, from a client application operating on a client device, a product visual order including a customer identifier indicative of a customer, a product identifier indicative of a tangible product, and at least one scan parameter. The client device may be located remotely from an acquisition system that is configured to generate product visuals. Or the client device and the acquisition system may be located on a customer's premises.

The client application can be a web-based application. For example, the client application may be hosted in a server-based computing environment, and the client device may be a thin client configured to connect to the server-based computing environment. With this arrangement, the client device may access the client application using a web browser.

Block 902 may involve generating a product profile corresponding to the product visual order in a product visual database. The product profile may include the product identifier and be associated with a customer account for the customer.

Block 904 may involve transmitting acquisition instructions to the acquisition system for acquiring product visual data in accordance with the at least one scan parameter, with reception of the acquisition instructions by the acquisition system causing a camera of the acquisition system to capture product visual data indicative of the tangible product.

The acquisition instructions can include instructions for manipulating a position or orientation of the camera using a robotic manipulator of the acquisition system.

In some examples, the acquisition system may include a lighting wall having individually-controllable lighting elements. Further, the acquisition instructions can include instructions for controlling the lighting elements.

Block 906 may involve transforming the captured product visual data into a product visual of the tangible product.

In one example, the at least one scan parameter of the product visual order can specify a model type. Further, transforming the captured visual data into the product visual of the tangible product can include transforming the captured product visual data into a model of the tangible product in accordance with the specified model type. As one example, the captured product visual data can include 2D images captured from multiple different viewpoints around the tangible product, and the product visual of the tangible product can be a 360-degree model. With this example, transforming the captured visual data into the model of the tangible product can involve storing the 2D images as a sequence of images for display within a 360-degree model viewer.

The product visual of the tangible product can include an augmented reality model and an associated viewing configuration. The associated viewing configuration can include lighting information, shader information, or both. Alternatively, the product visual of the tangible product can include a 360-degree model. Or the product visual of the tangible product can include a virtual reality model and an associated viewing configuration.

Additional blocks, not explicitly illustrated in FIG. 9, may involve providing, to the customer, shipping information that specifies a destination to which the tangible product is to be shipped and, after the tangible product is received at the destination, receiving confirmation that the tangible product is positioned in the acquisition system. Further, transmitting the acquisition instructions can include transmitting the acquisition instructions after receiving the confirmation.

Moreover, additional blocks may involve receiving, by the one or more network servers from the client application, a request form the customer to share the product profile privately with a third-party account, and providing access to the product profile to the third-party account.

The embodiments of FIG. 9 may be simplified by the removal of any one or more of the features shown therein. Further, these embodiments may be combined with features, aspects, and/or implementations of any of the previous figures or otherwise described herein.

8. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrently or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
an acquisition system configured for capturing product visuals of physical products, the acquisition system comprising a robotic arm and a camera coupled to the robotic arm; and
at least one network server storing program instructions that, upon execution by at least one processor of the at least one network server, cause:
the at least one network server to receive, from a client application operating on a client device, a product visual order requesting generation of a product visual for a physical product, the product visual order including a customer identifier indicative of a customer, a product identifier indicative of the physical product, and at least one scan parameter, wherein the client device is located remotely from the acquisition system, the at least one network server to generate a product profile corresponding to the product visual order in a product visual database, wherein the product profile includes the product identifier and is associated with a customer account for the customer, the at least one network server to transmit, to the acquisition system, acquisition instructions for acquiring product visual data indicative of the physical product in accordance with the at least one scan parameter, wherein reception of the acquisition instructions by the acquisition system causes the robotic arm to adjust a position the camera and causes the camera to capture two-dimensional images corresponding to multiple viewpoints of the physical product, the at least one network server to transform the captured two-dimensional images into the product visual of the physical product, and the at least one network server to store the product visual in the product profile.

2. The system of claim 1, wherein the operations further comprise:

receiving, from the client application, a request to view the product visual; and transmitting the product visual to the client device, wherein reception of the product visual causes display of the product visual.

3. The system of claim 1, wherein the operations further comprise:

receiving, from the client application, a request from the customer to add the product profile to a private digital product catalog associated with the customer account; and adding the product profile to the private digital product catalog.

4. The system of claim 1, wherein the operations further comprise:

receiving, from the client application, a request from the customer to share the product profile privately with a third-party account; and providing access to the product profile to the third-party account.

5. The system of claim 1, wherein the operations further comprise:

receiving, from the client application, a request from the customer to share the product profile publicly with a plurality of users of the client application; and providing access to the product profile to the plurality of users.

6. The system of claim 1, wherein the operations further comprise:

receiving, from the client application, a textual description of the physical product; and adding the textual description to the product profile.

7. The system of claim 1, wherein the product visual of the physical product comprises an augmented reality model and an associated viewing configuration.

8. The system of claim 7, wherein the associated viewing configuration comprises lighting information, shader information, or both.

9. The system of claim 1, wherein the product visual of the physical product comprises a 360-degree model.

10. The system of claim 1, wherein the product visual of the physical product comprises a virtual reality model and an associated viewing configuration.

11. The system of claim 1:

wherein the at least one scan parameter specifies a model type, and wherein transforming the captured product visual data into the product visual of the physical product comprises transforming the captured product visual data into a model of the physical product in accordance with the specified model type.

12. The system of claim 11, wherein the product visual of the physical product comprises a 360-degree model, and wherein transforming the two-dimensional images into the model of the physical product comprises storing the two-dimensional images as a sequence of images for display within a 360-degree model viewer.

13. The system of claim 1, wherein the acquisition instructions comprise instructions for manipulating a position or orientation of the camera using the robotic arm.

14. The system of claim 1:

wherein the acquisition system further comprises a lighting wall having individually-controllable lighting elements, and wherein the acquisition instructions comprise instructions for controlling the lighting elements.

15. The system of claim 1:

wherein the operations further comprise (i) providing, to the customer, shipping information that specifies a destination to which the physical product is to be shipped, and (ii) after the physical product is received at the destination, receiving confirmation that the physical product is positioned in the acquisition system, and wherein transmitting the acquisition instructions comprises transmitting the acquisition instructions after receiving the confirmation.

16. A method for capturing product visuals of physical products comprising:

receiving, by at least one network server from a client application operating on a client device, a product visual order requesting generation of a product visual for a physical product, the product visual order including a customer identifier indicative of a customer, a product identifier indicative of the physical product, and at least one scan parameter, wherein the client device is located remotely from an acquisition system that is configured to generate capture the product visuals;

generating, by the at least one network server, a product profile corresponding to the product visual order in a product visual database, wherein the product profile includes the product identifier and is associated with a customer account for the customer;

transmitting, by the at least one network server, acquisition instructions to the acquisition system for acquiring product visual data indicative of the physical product in accordance with the at least one scan parameter, wherein reception of the acquisition instructions by the acquisition system causes a robotic arm of the acquisition system to adjust a position of a camera of the acquisition system and causes the camera to capture two-dimensional images corresponding to multiple viewpoints of the physical product;

transforming, by the at least one network server, the captured two-dimensional images into the product visual of the physical product; and storing the product visual in the product profile.

17. The method of claim 16, wherein the acquisition instructions comprise instructions for manipulating a position or orientation of the camera using the robotic arm.

18. The method of claim 16, further comprising:
providing, to the customer, shipping information that specifies a destination to which the physical product is to be shipped; and
after the physical product is received at the destination, receiving confirmation that the physical product is positioned in the acquisition system,
wherein transmitting the acquisition instructions comprises transmitting the acquisition instructions after receiving the confirmation.

19. The method of claim 16, further comprising:
receiving, by the one or more network servers from the client application, a request from the customer to share the product profile privately with a third-party account; and
providing access to the product profile to the third-party account.

20. A non-transitory computer-readable medium having stored therein instructions that, upon execution by at least one computing device, cause the at least one computing device to perform operations comprising:
receiving, from a client application operating on a client device, a product visual order for generation of a product visual for a physical product, the product visual order including a customer identifier indicative of a customer, a product identifier indicative of the physical product, and at least one scan parameter, wherein the client device is located remotely from an acquisition system that is configured to capture product visuals of physical products,
generating a product profile corresponding to the product visual order in a product visual database, wherein the product profile includes the product identifier and is associated with a customer account for the customer,
transmitting, to the acquisition system, acquisition instructions for acquiring product visual data indicative of the physical product in accordance with the at least one scan parameter, wherein reception of the acquisition instructions by the acquisition system causes a robotic arm of the acquisition system to adjust a position of a camera of the acquisition system and causes the camera to capture two-dimensional images corresponding to multiple viewpoints of the physical product,
transforming the captured two-dimensional images into the product visual of the physical product, and
storing the product visual in the product profile.

* * * * *